Aug. 13, 1940.   A. N. TROSHKIN   2,211,446
HOSE COUPLING
Filed July 28, 1939

INVENTOR.
Alexander N. Troshkin
BY Williams, Rich & Morse
ATTORNEYS

Patented Aug. 13, 1940

2,211,446

UNITED STATES PATENT OFFICE 2,211,446

HOSE COUPLING

Alexander N. Troshkin, New York, N. Y., assignor to Resistoflex Corporation, Belleville, N. J., a corporation of New York Application July 28, 1939, Serial No. 286,979

4 Claims. (Cl. 285—84)

This invention relates to hose couplings. More specifically it relates to that type of coupling whereby a flexible hose or tubing is permanently secured to a suitable metal fitting such as a threaded member.

The coupling of this invention is particularly adapted for use with a new kind of hose or tubing, recently introduced, which is formed in whole or in part of polyvinyl alcohol. Reference may be had to Schnabel Patent No. 2,053,112 for several examples of such tubing. It is equally useful with other hose or tubing having similar physical characteristics.

It has been found that couplings which are satisfactory with rubber hose are unsuitable for use with hose or tubing made of polyvinyl alcohol because of differences in the physical characteristics of the two materials. Polyvinyl alcohol tubing, while flexible and somewhat elastic, is tougher and less compressible than flexible vulcanized rubber. It has a smoother surface and its coefficient of friction against metal is much less than that of rubber. Because it has greater hardness or toughness than rubber it conforms itself less readily to irregular surfaces. At the same time the field of usefulness of polyvinyl alcohol tubing is such that couplings with which it is used must be capable of withstanding high internal pressures and severe mechanical stresses.

The usefulness of polyvinyl alcohol tubing is due largely to its characteristic resistance to oils, fluid fuels and many organic solvents. Because it is not very resistant to water, however, it is usually provided with a suitable waterproof outer covering of rubber, lacquered braid or other material. In the case of such covered tubing the inner layer of polyvinyl alcohol may be quite thin. If the coupling part which is inserted into the tubing, herein referred to as the shank, is provided with such barb-like projections as are commonly in use with rubber hose they may cut into the polyvinyl alcohol tubing and sever it or at least seriously diminish its strength. If a smooth shank is used there is an insufficient grip on the hose to withstand high tensile strains or internal pressures. If the shank is provided with another common type of rounded rib, the polyvinyl alcohol tubing, because of its lack of compressibility, will be held out of contact with the adjacent surfaces of the shank with consequent impairment of the strength of the coupling due to the reduction of the area of frictional contact.

It has been discovered that a union between the hose and the coupling, of sufficient strength to hold fast up to the burst pressure of the tubing, can be had by providing a shank having one or more circumferential ridges which merge with the adjacent surface of the shank by relatively obtuse angles and are gradually tapered in the direction of pull, in combination with a ferrule which is radially contracted onto the hose end to compress it onto the shank so that the inner surface of polyvinyl alcohol is in frictional contact with the surface of the shank throughout its length, the compression of the ferrule being effected in such a manner that the hose is also forced into intimate contact with the faces of the circumferential ridges. The compression of the hose between the shank and the ferrule is more or less uniform throughout the area of contact, so as not to produce any high, concentrated stresses of such magnitude as to damage the hose or its polyvinyl alcohol liner. With this coupling construction, hereinafter described more in detail, an exceedingly strong union can be made without compressing the hose beyond its deformation point.

By way of illustration the present preferred embodiment of the invention will now be described in conjunction with the drawing, in which.

Figure 1:
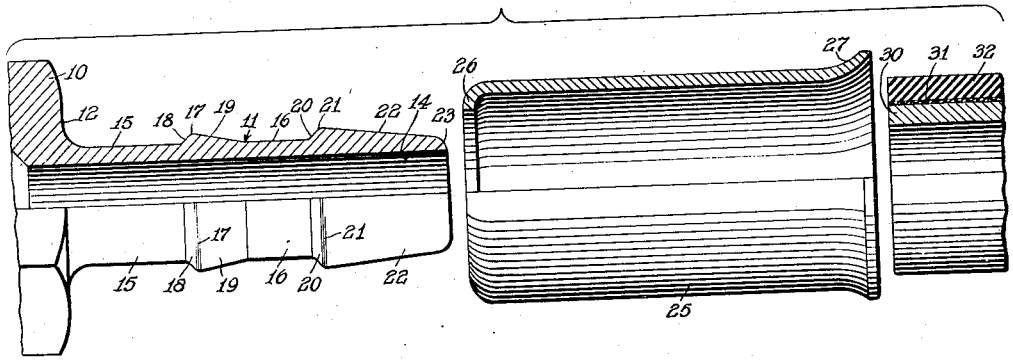
Fig. 1 is an expanded view showing the shank, the ferrule and the hose end, in half-section, before assembling.

Referring to the drawing, Fig. 1, the parts from left to right are the coupling member, the ferrule and the hose or tubing end. The coupling member has two main parts, formed from a single piece of metal. The connector portion 10 is here shown as an internally threaded fitting part having a nut-like hexagonal surface. This part may have any shape desired, according to the type of connection to be made. The shank 11 is of smaller diameter so that the face 12 of the coupling portion serves as a shoulder at the rear end of the shank. (Parts to the left in the drawing will be referred to as "rear" and to the right as "forward".)

The shank has a cylindrical bore 14 for conveying fluid. Its outer surface is formed with two cylindrical surfaces 15 and 16 between which is an intermediate circumferential ridge 17. This ridge slopes rearwardly as at 18, a slope of 45° being desirable but not at all critical. The ridge 17 is tapered forwardly as at 19 and merges with the cylindrical surface 16. In rear of the forward end of the shank is a similar slope 20 and ridge 21 which tapers as at 22 to the rounded forward end 23 of the shank. The minimum diameter of the shank should preferably be slightly larger than the inside diameter of the hose so that the hose fits onto it with a positive radial pressure.

The ferrule 25 is formed, preferably by deep drawing of any suitable metal and is slightly longer than the shank. For holding purposes, the effective length of the ferrule 25 is that portion which overlies the shank. It is provided with an inwardly-turned rear end 26 and with a flare 27 at its forward end. This flare prevents cutting of the tubing by the ferrule when flexed. The internal diameter of the ferrule should be such as to fit the outside of the hose end snugly with a hand fit prior to insertion of the shank.

The hose end shown in the drawing has an inner layer 30 of polyvinyl alcohol composition upon which is a layer of braid 31, which may be either textile or wire, and an outer cover 32 of rubber or other waterproof material. It will be understood, of course, that outer layers of a variety of kinds may be used.

Figure 2:
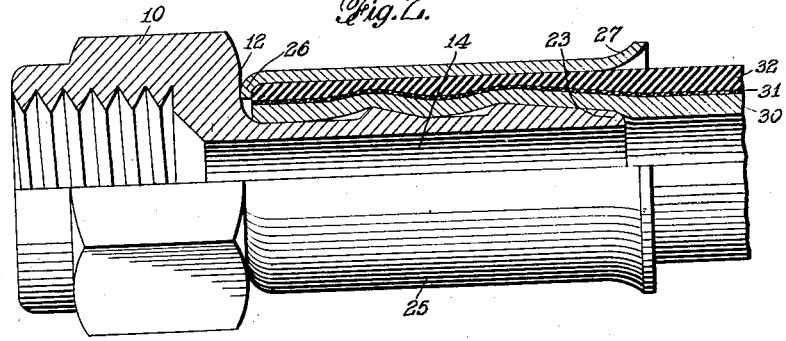
Fig. 2 shows in half-section the parts in assembled position prior to compression of the ferrule.
Figure 3:
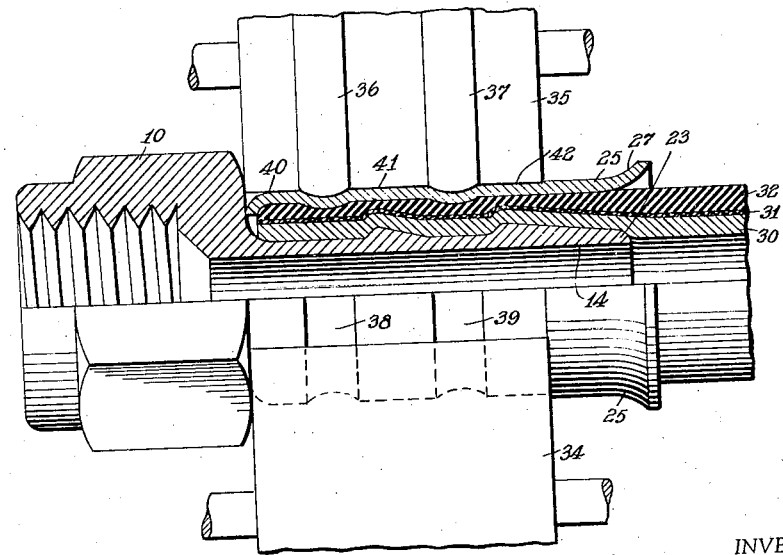
Fig. 3 shows in half-section the completed coupling with parts of the rollers used for compressing the ferrule.

In assembling the coupling on the hose end the ferrule 25 is slipped on the hose as far as it will go. The hose end and ferrule are then forced onto the shank, preferably while the latter is rapidly rotated by any suitable device, until the ferrule comes in contact with the shoulder 12. The condition of the parts at this stage is shown in Fig. 2. It will be noted that the tubing is not in contact with the shank behind the ridges. The assembled coupling is then placed between a set of rollers, as indicated in Fig. 3, and radially compressed. The rollers preferably include two parallel plane cylindrical lower rollers 34, set close together, upon which the ferrule rests, and an upper roller 35 which has rounded peripheral ribs 36 and 37 of such shape and so spaced as to additionally compress the ferrule behind the ridges 17 and 21 and force the hose into intimate contact therewith without setting up concentrated shearing stresses at any point. The two lower rollers 34 are power-driven to rotate in the same direction and while the coupling is being rotated by them the upper roller 35 is pressed down upon it until the ferrule has been radially contracted throughout its area of contact with the rollers. The grooves 38 and 39 are formed in the ferrule at the same time and serve to crowd the material of the hose against the ridges 17 and 21.

The design of the upper roller 35 is such that as it is pressed against the ferrule 25 the ribs 36 and 37 tend to force the metal to flow away from the centers of grooves 38 and 39, allowing the ferrule to bulge outwardly on either side of each groove. In prior art couplings having rolled grooves this bulging is permitted to remain and results in a release of pressure between the points of increased pressure. In the coupling of the present invention, however, as roller 35 is pressed further, the flat surfaces 40, 41 and 42 force the metal to flow back and further compress the surface of the ferrule. This results in a general contraction of the ferrule, which is, at the conclusion of the operation, of uniform thickness throughout.

Tubing of ¼" I. D. equipped with the coupling of this invention has shown in tests the ability to withstand tensile strains, tending to pull the hose out of the coupling, of over 300 pounds and hydraulic pressures in excess of 1500 pounds which burst the hose without disrupting the coupling.

Various modifications may be made in the details of construction above particularly described within the purview of the invention.

What is claimed is:

1. In combination with a hose end having an inner surface of flexible material of limited compressibility, a coupling member having a connector portion and a shank which enters the hose end, said shank having in rear of its forward end and at at least one intermediate point circumferential ridges gradually tapered forwardly and a cylindrical portion in rear of each ridge, a tubular metal ferrule surrounding the hose end and coextensive with the shank, said ferrule being radially compressed throughout that portion of its length overlying that part of the shank including said ridges and said cylindrical portions, whereby the diameter of the ferrule is reduced throughout said portion and further reduced at points behind said ridges.

2. In combination with a hose end having an inner surface of flexible material of limited compressibility, a coupling member having a connector portion and a shank which enters the hose end, said shank having in rear of its forward end and at an intermediate point sloping circumferential ridges gradually tapered forwardly and a cylindrical portion in rear of each ridge, a tubular metal ferrule surrounding the hose end and coextensive with the shank, said ferrule being radially compressed throughout that portion of its length overlying that part of the shank including said ridges and said cylindrical portions, whereby the diameter of the ferrule is reduced throughout said portion and further reduced at points behind said ridges.

3. In combination with a hose end having an inner surface of flexible material of limited compressibility, a coupling member having a shank entering the hose end and a connector portion of larger diameter than the shank so as to provide a shoulder at the rear end of the shank, said shank having in rear of its forward end and at an intermediate point sloping circumferential ridges gradually tapered forwardly and a substantially cylindrical portion in rear of each ridge, a tubular metal ferrule surrounding the hose end and coextensive with the shank, said ferrule having an inwardly turned end abutting said shoulder, said ferrule being radially compressed throughout that portion of its length overlying that part of the shank including said ridges and said cylindrical portions, whereby the diameter of the ferrule is reduced throughout said portion and further reduced at points behind said ridges.

4. In combination with a hose end having an inner surface of flexible material of limited compressibility, a coupling member having a connector portion and a shank which enters the hose end, said shank having in rear of its forward end and at at least one intermediate point circumferential ridges gradually tapered forwardly and a cylindrical portion in rear of each ridge, the diameter of the cylindrical portions being slightly greater than the inside diameter of the hose, a tubular metal ferrule surrounding the hose end and coextensive with the shank, said ferrule being radially compressed throughout that portion of its length overlying that part of the shank including said ridges and said cylindrical portions, whereby the diameter of the ferrule is reduced throughout said portion and further reduced at points behind said ridges.

ALEXANDER N. TROSHKIN.